United States Patent

[11] 3,622,043

| [72] | Inventor | Bernard Chotard<br>15 rue Georges Legagneux, 72 Le Mans,<br>France |
|---|---|---|
| [21] | Appl. No. | 889,184 |
| [22] | Filed | Dec. 30, 1969 |
| [45] | Patented | Nov. 23, 1971 |

[54] AUTOMATIC PRESENTATION STORAGE UNIT WITH MOVEABLE TRAY SYSTEM
14 Claims, 24 Drawing Figs.

[52] U.S. Cl. .................................................. 221/261,
198/20, 312/97
[51] Int. Cl. .................................................. B65g 59/00
[50] Field of Search.................................... 214/16.1
CC, 16.1 CD; 198/85, 81, 222, 20, 32, 106, 25, 24;
221/261; 312/134, 97, 127

[56] References Cited
UNITED STATES PATENTS
2,031,392  2/1936  Taylor.......................... 214/16.1 CC
2,258,530  10/1941  Auger........................... 214/16.1 CD
2,944,656  7/1960  Balkema....................... 198/185
FOREIGN PATENTS
1,246,910  10/1959  France......................... 214/16.1 CD

Primary Examiner—Richard E. Aegerter
Attorney—Amster & Rothstein

ABSTRACT: An automatic storage unit with movable trays characterized essentially in that it comprises internally an electric motor, at least one horizontal endless conveyor actuated by said motor, independent parallel trays carried by the upper span of said conveyor, disposed transversely and adapted to carry the objects to be displaced said trays comprising on their lower faces rack means and at their ends coupling members a adapted to cause the mutual coupling of said trays so as to constitute, externally of the storage unit, a continuous row of trays along an output axis extending at right angles to the conveyor's axis.

PATENTED NOV 23 1971 3,622,043

INVENTOR:
BERNARD CHOTARD
BY
Amster & Rothstein
ATTORNEYS.

AUTOMATIC PRESENTATION STORAGE UNIT WITH MOVEABLE TRAY SYSTEM

BACKGROUND OF THE INVENTION

The present invention relates to an automatic presentation storage unit or piece of furniture comprising movable trays.

The handling of objects between a storage unit and a zone where these objects are actually used is found both in office work and in any private house. Thus, in many cases dockets, files, index books and like articles are transported form a storage cupboard or chest to a desk where they are consulted or otherwise used, and vice versa, and likewise household requisites are also transferred from a kitchen cupboard to a table where the meals are taken.

Up to now, in order to reduce manual work in both private houses and offices, endeavors have been made more particularly with a view to improve transformation operations, without paying much attention to the handling of the various objects constituting the daily surrounding of household tasks and sedentary occupations.

SUMMARY OF THE INVENTION

This invention is concerned with a piece of furniture or storage unit adapted to simplify considerably considerably these tasks and occupations by the provision of means capable of transferring automatically the content of said piece or unit to a table or flat surface, and vice versa, i.e. performing the automatic storage of said objects in the storage unit or piece of furniture.

To this end, the automatic storage unit with movable trays according to the present invention is characterized essentially in that it comprises internally an electric motor, at least one horizontal endless conveyor actuated by said motor, independent parallel trays carried by the upper span of said conveyor disposed transversely and adapted to carry the objects to be displaced, members carried at spaced intervals by said conveyor for positively driving said movable trays along the conveyor's axis while permitting a relative transverse sliding movement of said trays in relation to said conveyor, said trays comprising on their lower faces rack means and at their ends coupling members adapted to cause the mutual coupling of said trays so as to constitute, externally of the storage unit, a continuous row of trays along an output axis extending at right angles to the conveyor's axis, a toothed driving wheel disposed in front of the end of, and at right angles to, said conveyor, said toothed wheel being rotatably driven from said electric motor and adapted to be drivingly engaged by the rack means of the successive trays carried by said conveyor, and a motion-transmitting mechanism disposed between said electric motor, on the one hand, and said driving toothed wheel and said conveyor, on the other hand, whereby said conveyor can move each tray through a distance corresponding to its width, in the longitudinal direction of said conveyor, while said driving toothed wheel causes the tray drivingly engaged therewith through its rack means to travel through a distance corresponding to the length of the tray along the axis of the outward travel of said trays which extends at right angles to the conveyor's axis.

According to a specific form of embodiment of this invention said piece of furniture or storage unit comprises two coplanar opposite conveyors disposed symmetrically on either side of the axis of the outward travel of said trays, and in this case a central driving tray is disposed, in the storage position, between the registering or adjacent ends of said conveyors, means being also provided for causing, after said central tray has been driven out from the unit, the delivery either of the successive trays carried by one conveyor, or of the successive trays carried by the other conveyor, the various trays delivered in succession by the two conveyors being coupled in succession to the central driving tray and to one another, so as to form a continuous rectilinear line of trays.

These trays may be provided with special detachable support means for storing any desired objects such as dishes, glasses, knives, in the case of household requisites, or dockets, files, etc. in the case of an application to office work.

The storage unit or like piece of furniture according to this invention may if desired be designed for performing a predetermined operation particularly required, such as heating, cooling, refrigerating, drying, etc.

Side doors may be provided to permit a manual access to the stored objects or articles.

BRIEF DESCRIPTION OF THE DRAWING

Various forms of embodiment of this invention will now be described by way of example with reference to the attached drawing, in which.

DESCRIPTION OF THE PREFERRED EMBODIMENTS

Figures 1, 2, 3, 4:
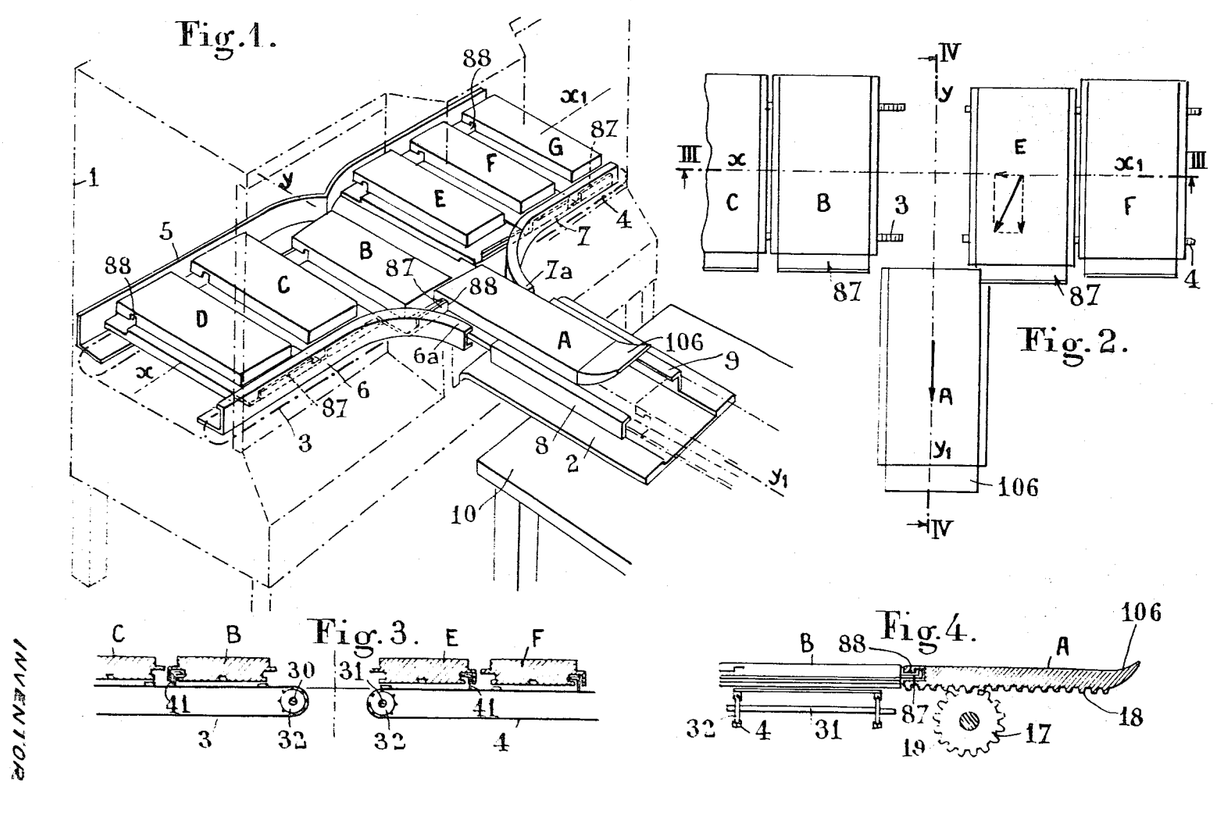
FIG. 1 is a perspective diagrammatic view of an automatic presentation storage unit or like piece of furniture with movable trays according to a first form of embodiment comprising two lateral conveyors and a central exit.
FIG. 2 is a diagrammatic plane view illustrating the outward movement of the trays.
FIG. 3 is a diagrammatic section taken along the line III—III of FIG. 2.
FIG. 4 is a diagrammatic sectional view taken along the IV—IV of FIG. 2.

The automatic presentation piece of furniture or storage unit 1 with movable trays illustrated diagrammatically in FIG. 1 comprises a frame structure or body having on its front face a door 2 adapted to swing about a horizontal axis as will be seen presently. Within the storage unit 1 and disposed in a common plane and opposite relationship are a pair of horizontal endless conveyor belts 3 and 4 having a common center line x–x1. These belts carry on their upper span or reach a plurality of movable trays, the number of these trays being immaterial. These trays are adapted to carry miscellaneous objects to be stored in the unit, for example forks and spoons, dockets, files, etc.

In the specific and exemplary form of embodiment illustrated in FIG. 1 the piece of furniture or storage unit 1 is adapted to contain seven movable trays, namely a central tray A disposed, in the inoperative position, i.e. when the trays are not extracted from the unit, between the registering ends of the pair of conveyor belts 3 and 4, these belts 3 and 4 carrying each three trays, namely trays B, C and D driven by the left-hand belt 3 and trays E, F and G driven by the right-hand belt 4.

The different movable trays are guided during their movements within the unit 1 by lateral guide means of slideway form, namely a rear guide member 5 and a pair of front guide members 6 and 7, which have curved portions adjacent the tray outlet aperture, so as to merge substantially into a pair of rectilinear guide members 8 and 9 secured to the inner surface of the swinging door 2. When this door is in its open or horizontal position as illustrated in FIG. 1 for extracting the trays from the unit and positioning them in-line on a table 10 the guide members 8 and 9 extend parallel to the horizontal centerline y–y1 of the outward path followed by these trays which is perpendicular to the above-defined centerline x–x1 of endless belts 3 and 4.

Figure 5:
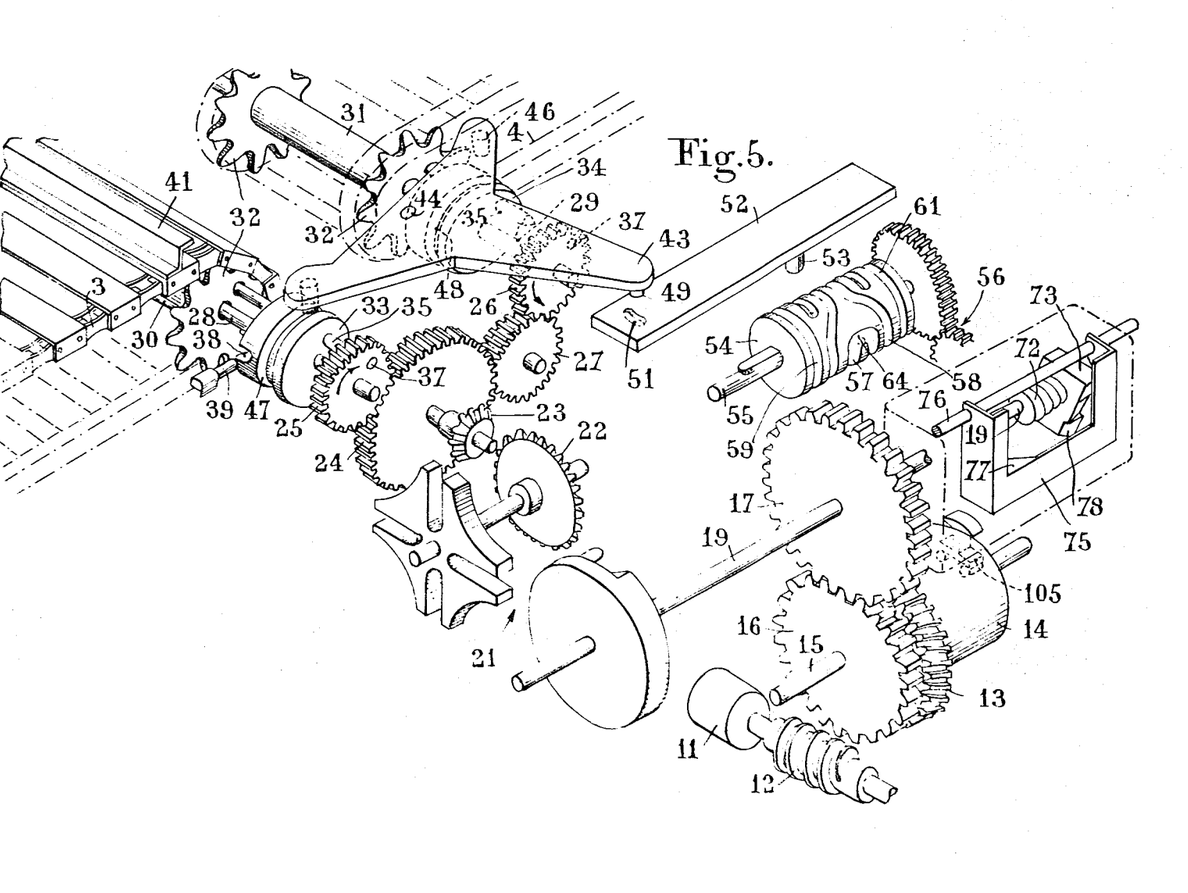
FIG. 5 is an exploded perspective view showing the mechanism for driving the conveyors together with the toothed wheel in meshing engagement with the rack means of movable trays.

Now the device provided for driving the various movable trays will be described in detail with particular reference to FIGS. 5, 6 and 7.

The tray movements are obtained by energizing an electric motor 11 having its output shaft coupled to a reduction gearing comprising for example a worm 12 meshing with a driven worm wheel 13. This driven wheel 13 is adapted to drive in turn, possibly through the medium of a torque limiter 14, a shaft 15 rigid with a pinion 16 meshing in turn with a tray-driving toothed wheel 17.

As clearly shown in FIG. 4 this toothed wheel 17 is adapted to be brought into meshing engagement with longitudinal racks 18 (i.e. parallel to axis y–y1) carried by the lower face of the various movable trays, so as to produce the longitudinal inward and outward movements of the movable trays.

The toothed wheel 17 is rigid with a transverse shaft 19 imparting a continuous or intermittent motion to the conveyor belts 3 and 4, by reason of only one belt at a time. In the exemplary form of embodiment illustrated in FIG. 5 these belts are driven intermittently and to this end the transverse shaft 19 drives a transmission device of the Geneva-wheel type 21 adapted rotatably to drive through a pair of bevel gears 22, 23 a toothed wheel 24. This toothed wheel 24 drives in turn a pair of pinions 25, 26 revolving in opposite directions, pinion 25 being in direct meshing engagement with toothed wheel 24 while an intermediate pinion 27 is disposed between said wheel 24 and pinion 26. Both pinions 25 and 26 are engaged on cylindrical coaxial hubs 30, 31 having their ends rigid with toothed wheels 32 sliplessly driving the endless conveyor belts 3 and 4.

The number of teeth of these various gears is so calculated that the length of the movable tray extracted from the unit by the toothed wheel 17 corresponds exactly to a movement of the conveyor belt 3 or 4 which is exactly as long as the width of each tray.

Slidably mounted on shafts 28 and 29 are clutch members 33 and 34 each rigid with a longitudinal pin 35 disposed eccentrically in relation to shaft 27 and extending through the relevant clutch member. Each eccentric pin 35 is constantly engaged into a hole formed in one of the toothed wheels rigid with hubs 30 and 31, so as to constantly maintain the driving rotary coupling between on the one hand clutch member 33 with hub 30 and on the other clutch member 34 with hub 31. At its front end each pin 35 is tapered so that it can engage a driving hole 37 formed in each one of said pinions 25 and 26.

Each sliding clutch member 33 and 34 has formed in its outer periphery a retaining groove 38 engageable by a lock bolt 39 when the corresponding clutch member is in its uncoupled or disengaged position.

For driving the various movable trays each conveyor belt 3, 4 carries at spaced intervals driving bars 41 adapted to engage grooves 42 of corresponding contour which are formed in the lower faces of said movable trays.

Since only one of the conveyor belts 3 or 4 is actuated at any time, the clutch members 33 and 34 are operatively interconnected through a fork 43 fulcrumed about a vertical pivot pin 44. This fork 43 carries a pair of studs 45 and 46 engaging annular transverse grooves 47 and 48 formed in the peripheral surface of clutch members 33 and 34, respectively. The pivoting fork 43 also carries a pin 49 engaging a curved elongated hole 51 formed in a control bar 52. This bar 52 carries in turn a depending pin 53 slidably engaging guide grooves formed in the outer surface of a drum-type cam member 54. This cam member 54 is keyed on a coaxial shaft 55 so that it can slide freely on this shaft and on the other hand it is rotatably driven from the main shaft 19 via a train of reduction gears 56.

Said drum-type cam member 54 is disposed symmetrically in relation to a transverse plane and has formed on its outer periphery a pair of symmetric cam grooves 57 and 58 and a pair of lateral holding grooves 59 and 61.

The function of this cam member 54 is to reverse the positions of clutch members 33 and 34 when all the trays contained in one side of the storage unit have been expelled therefrom, so as to cause the trays contained in the opposite side to be delivered in turn. When cam member 54 revolves while in its endmost position at the right as seen in FIG. 6 the depending pin 53 of bar 52 follows the cam groove 57, cam member 54 being held against axial movement by a fixed stud 62 engaging the lateral holding groove 61. In this case the clutch members 33 and 34 are shifted forwards and backwards, respectively. Therefore, the eccentric pin 35 of clutch member 33 engages the hole 37 of pinion 25 whereby the hub 30 is rotatably driven in the clockwise direction and the upper span of the left-hand conveyor belt 3 is moved to the right, so as to cause trays B, C and D to move towards the center of the storage unit 1. Besides, since clutch member 34 is in its backward position its eccentric pin 35 is disengaged from hole 37 of pinion 26 and the hub 31 together with the corresponding conveyor belt 4 are kept in their inoperative condition.

On the other hand, when cam member 54 is shifted axially to its endmost left-hand position the pin 53 of bar 52 engages the cam groove 58 and follows same to cause a movement of translation of said bar 52 and therefore a pivotal movement of fork 43, thus reversing the positions of clutch members 33 and 34. Under these conditions, it is the right-hand conveyor belt 4 that moves from right to left, the other belt 3 remaining stationary. Cam member 54 is held against axial movement in its endmost left-hand position by a pin 63 engaging the holding groove 59.

It is only when all the movable trays A to G are stored within the unit 1 that the cam 54 can be shifted laterally along its shaft 55 for changing the priority order in which the trays can be delivered from the unit. In fact, in this case and as shown in FIG. 6 the two cam grooves 57 and 58 communicate with each other through a groove extension 64 formed at their adjacent ends, and on the other hand notches 65 formed in the outer faces of the pair of holding grooves 59 and 51 register with the holding pins 62 and 63, thus permitting the release and the sliding movement of this cam member.

The sliding movement of cam member 54 is produced through a pull rod 66 carrying at its operative end a radial finger 67 engageable into one of said holding grooves, for instance groove 61. This pull rod 66 can be actuated either manually or electrically. It is adapted to actuate a safety limit switch 68 so connected that the electric motor 11 cannot be started unless the cam member 54 is in one of its endmost positions.

Figures 6, 7:
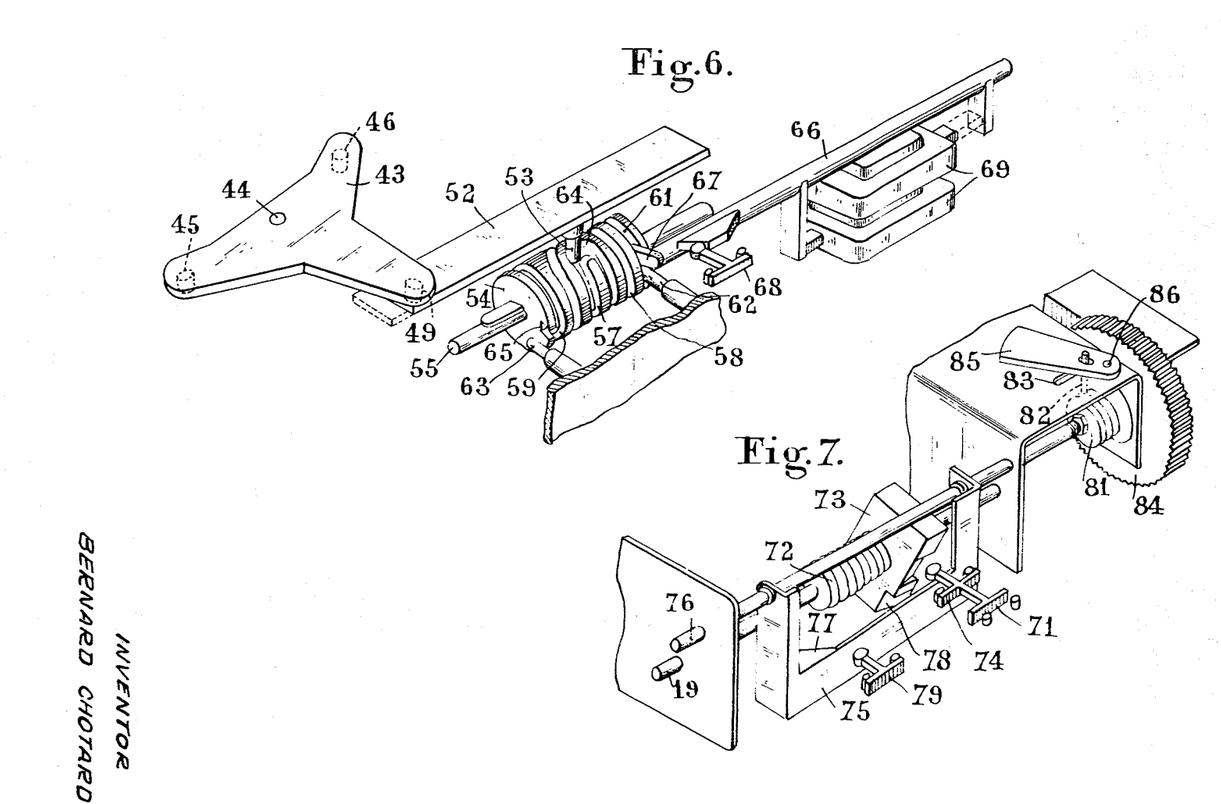
FIG. 6 is a perspective view showing the mechanism controlling the priority rank of the trays carried by two conveyors and to be delivered from the unit.
FIG. 7 is a perspective view showing the mechanism for adjusting the length of the outward stroke of said trays.

Besides, if this pull rod 66 is electrically operated by means of say, electromagnets 69, these cannot be energized unless all the movable trays are housed within the unit 1, as shown by a contact 71 (FIG. 7).

From the above description it is clear that when the electric motor 11 is started the rotation of its output shaft causes the central tray A to perform a forward movement of translation, in its longitudinal direction, i.e. along the axis y–y1, this central tray A previously occupying a position between the adjacent ends of conveyor belts 3 and 4. This tray A causes with its front end the swinging of door 2 to its horizontal position, so that the first tray A can move out from the unit 11. Then, according to the position of cam member 54, one of the conveyor belts is driven. In the example illustrated in FIG. 2 the first endless belt to be actuated is the left-hand one 3, whereby trays B, C and D are moved in the transverse direction along the axis x–x1 by a transverse bars 41 carried by this belt, and these trays are coupled in succession to one another by means to be described presently, so as to constitute a continuous line of trays which are thus extracted or expelled from the storage unit 1 and caused to present to the user the objects or articles carried by them. The right-hand conveyor belt 4 may then be started in turn for subsequently extracting or expelling the other trays E, F and G.

New reference will be made more particularly to FIG. 7 to describe the means contemplated for adjusting the length of the outward movement, i.e. the number of movable trays extracted from the unit 1. This device comprises a worm 72 rigid with the main driving shaft 19 and engaging a nut 73. At one end of its stroke corresponding to the storage of all the trays within the unit 1, nut 73 actuates on the one hand a front contact 71, so as to close same, and on the other hand a back control 74, so as to open same.

For adjusting the length of the tray outward movement there is provided a blade 75 adapted to pivot freely about a shaft 76 mounted for longitudinal sliding movement on the frame structure of the apparatus. This blade 75 carries a cam face 77 engageable by another cam face 78 formed on said nut 73, so that the mutual engagement of these cam faces is attended by the upward movement of blade 75 and the opening of another back contact 79.

The longitudinal movement of shaft 76 supporting the blade 75 is caused by a mechanism comprising a worm 81 rigid with said shaft 76 and held against rotation by a pin 82 slidably engaging a groove 83 formed in the frame structure of the apparatus; this worm 81 engages a corresponding tapped hole formed in a knurled knob or nut 84 adapted to be adjusted manually. The length of the adjusted or preset outward movement of the trays is visible or marked by an arrow or quadrant 85 pivotally mounted on a pin 86 and driven by said pin 82.

Thus, according to the longitudinal position of blade 75, which position is adjustable by rotating the knurled knot 84, the nut 73 will move to a variable extent before causing its cam face 78 to lift the blade 75 and thus open the contact 79 inserted in the energizing circuit of motor 11. Under these conditions, the length of the outward movement of trays A–G can easily be adjusted.

Now reference will be made more particularly to FIG. 8 to describe an exemplary form of embodiment of the trays supporting the objects to be presented or handled.

As already explained hereinabove each tray, such as tray B illustrated in FIG. 8, comprises on its lower face a longitudinal rack 18 meshing or adapted to mesh with the toothed driving wheel 17 for producing the outward or inward movements of said trays.

Besides, each tray is also provided on its lower face with a groove 42 parallel to rack 18 and engageable by one of said driving bars 41. The shape of groove 42 is immaterial; however, the L shape illustrated in FIG. 8 permits of avoiding any untimely release of the movable tray from its driving bar.

At its two longitudinal ends, each tray comprises a male coupling member 87 and a female coupling groove 89, respectively both of the mutually sliding type and adapted to cause the relative coupling of adjacent trays during their outward movement.

Figure 8:
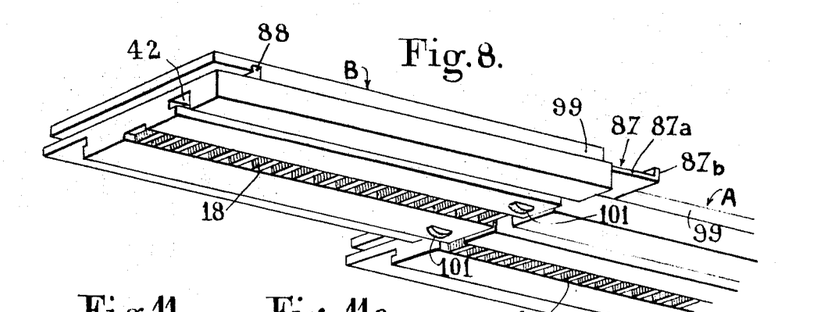
FIG. 8 is a perspective view from beneath showing two trays coupled to each other.
Figures 9, 10, 11, 11A, 12, 12A, 13, 14, 15:
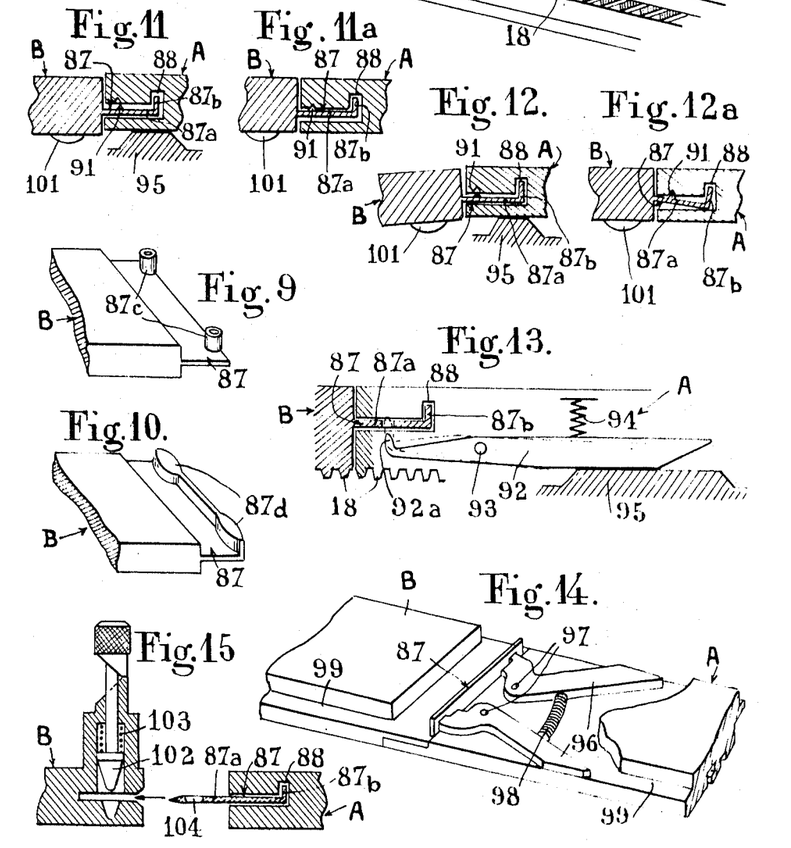
FIG. 9 is a perspective view showing a modified form of embodiment of a male coupling member or slideway.
FIG. 10 is a perspective view of another form of embodiment of a male coupling slide.
FIGS. 11 and 11a are fragmentary diagrammatic sectional views showing a typical form of embodiment of a device for coupling a pair of adjacent trays.
FIGS. 12 and 12a are fragmentary sections showing diagrammatically a modified form of embodiment of the devices for coupling a pair of adjacent trays.
FIG. 13 is a fragmentary diagrammatic section showing a modified form of embodiment of the tray-coupling device.
FIG. 14 is a perspective view of another device for coupling a pair of adjacent trays.
FIG. 15 is a fragmentary sectional view of a device for separating a pair of previously coupled trays.

The male coupling member or slideway 87 may comprise a horizontal portion 87a having an upstanding lip or bent portion 87b at right angles to said horizontal portion, as shown in FIG. 8, but as an alternative said horizontal portion may comprise a pair of spaced rollers 87c as shown in FIG. 9, or beads 87d as shown in FIG. 10.

According to the specific applications contemplated, different means for mutually coupling or hooking the trays may be used. Thus, in FIGS. 11 and 11a the pair of adjacent trays A and B are coupled horizontally and the two slideways are mutually positioned and assembled by means of studs 91.

In the alternate form of embodiment illustrated in FIGS. 12 and 12a the junction between the two trays A and B is effected while these trays are inclined in relation to each other, and the mutual engagement is obtained with or without the use of studs 91 when the two trays are alignment in a horizontal plane, for automatically taking up the play necessary for a flat mutual coupling on the table.

According to a modified form of embodiment illustrated in FIG. 13 the two trays A and B are interlocked by means of pawls 92 pivoted about horizontal and transverse pins 93 and having their ends 92a engaged into holes formed in the male sliding member 87 of the adjacent tray. These pawls 92 are urged by springs 94 and the release action is obtained when these pawls engage fixed cam faces 95 as the trays are reintroduced into the apparatus.

In the form of embodiment illustrated in FIG. 14 the pair of adjacent trays A and B are interlocked by means of pawls 96 carried by one of these trays, pivotally mounted on vertical pins 97 and urged by springs 98. In this case, the release is obtained by the in-turned lips 6a and 7a of the front guide members 6 and 7 of the apparatus when the trays are reintroduced into the storage unit.

Each movable tray is also provided on its upper face with lateral shoulders 99 (FIG. 8) adapted to coact with the lateral guide members in order to hold the rack 18 of each tray in proper driving or meshing engagement with the toothed wheel 17.

Finally, rollers 101 may also be mounted on the lower face of each tray; in this case these rollers engage the table 10 when the trays are delivered in succession from the apparatus.

The movable trays may also be released completely from one another, outside the storage unit, by providing on these trays a bolt 102 urged by spring 103 (FIG. 15) for engagement into a hold 104 formed through the male coupling member 87. By pulling this bolt 102 upwards it is thus possible to separate ant pair of adjacent trays such as A, B from each other. In this case an electric safety switch 105 (FIG. 5) is provided inside the storage unit, ahead of the toothed wheel 17, for automatically stopping the movement immediately as the last coupled tray has been introduced.

As clearly shown in FIGS. 1 and 4, the central or front tray A carries at its front end a cam face 106 of upswept contour, adapted to a control with more smoothness the opening of the swinging door 2 by simply pushing same.

The guide members 5, 6 and 7 (FIG. 1) ensure a proper presentation of the trays as they emerge from the storage unit and when they are coupled to one another. The upper ledges 6a and 7a of the front guide members 6 and 7, which assist in maintaining the longitudinal rack 18 of each tray in meshing engagement with the driving toothed wheel 17, may be extended throughout the length of these guide members in order to prevent any tendency of the trays to be lifted off the toothed wheel 17.

The guide members 5, 6 and 7 comprise a curved portion near the longitudinal axis y–y1 in order to facilitate the movements of the trays.

Figure 16:
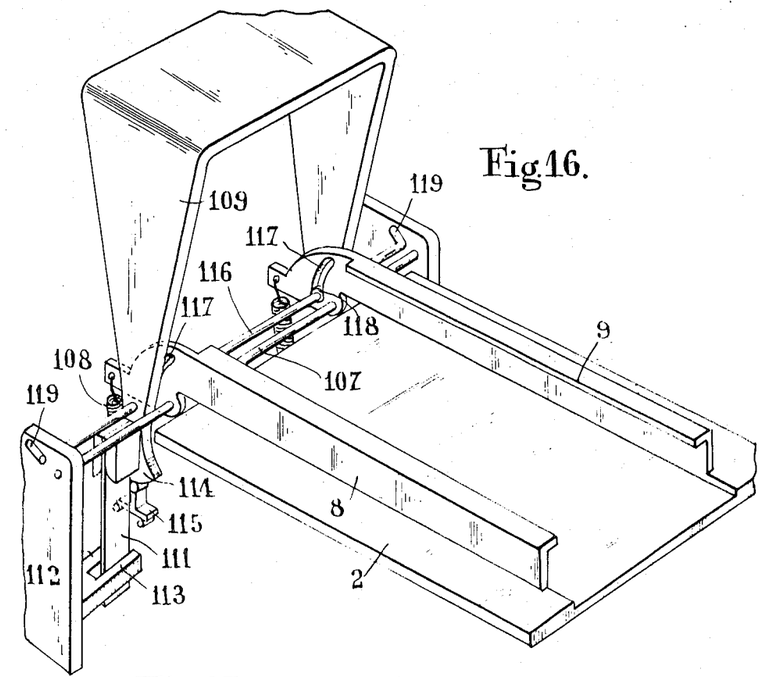
FIG. 16 is a perspective view showing the swinging door in its horizontal position and the outlet gage.
Figure 17:
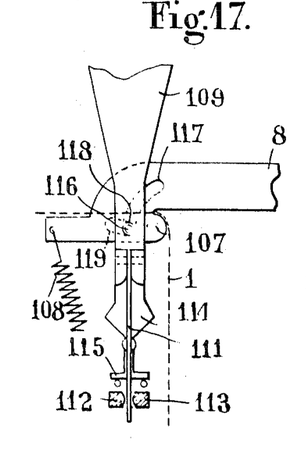
FIGS. 17, 18 and 19 are diagrammatic elevation views illustrating the operation of the safety device controlled by said gage.

Now reference will be made to FIG. 16 to describe the hinge mounting of the swinging door 2. This door is pivoted about a transverse horizontal shaft 107 carried by the frame structure and is urged to its closed position by one or two return springs 108 and also, if desired, by a complementary magnet lock or the like.

A safety contour gage 109 disposed ahead of, and behind, the door frame is adapted to stop the operation of the apparatus when this gage is displaced by an overdimensioned or ill-positioned object. This gage is retained in the vertical position as shown in FIG. 16 by a spring blade 111 interposed at its lower end between a pair of stops 112 and 113. This gage could also be retained in position by a pair of antagonistic springs, if desired.

Figure 18:
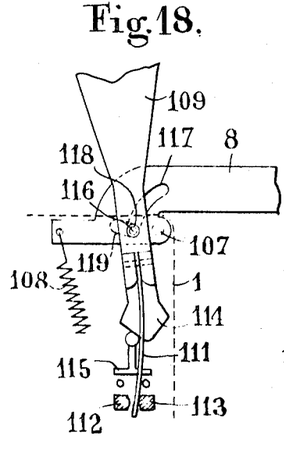
Figure 19:
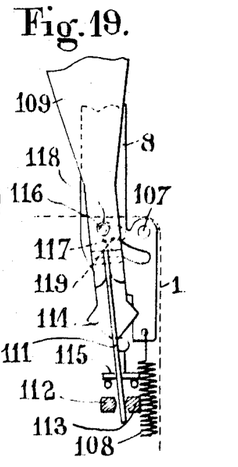

At its lower end the gage member 109 has a feeler-forming portion 114 adapted to engage a safety switch 115. This contact delivers energizing current to the electric motor of the apparatus as long as the gage 109 does not swing about its shaft 107 as a consequence of an abnormal thrust (as illustrated in FIG. 18).

The feeler 114 can actuate either a front contact as shown in FIGS. 16 to 19 or a back contact. In this last instance the feeler 114 is hollow and engages the contact only if an obstacle arises.

To permit the effortless closing of swinging door 2, the gage 109 can recede within the storage unit 1 through a pair of curved slots 117 acting as cam members and formed in the end portions of the lateral guide members 8 and 9 adjacent the pivot shaft 107. The transverse shaft 116 of gage 109 extends through these cam-forming slots 117 and engages same by means of rollers 118, and the ends of shaft 116 are also guided by a pair of slots 119 formed in the adjacent portions of the frame structure. During the pivotal movement of swinging door 2 in the closing direction the pair of cam-forming slots 117 cause the shaft 116 to recede, whereby the gage 109 is retracted within the piece of furniture 1.

If permitted by practical or service conditions, a simplified apparatus may be used which comprises only one side and a single lateral exit apparatus. All the coupling system described hereinabove and including notably cam 54, pivoting fork 43, clutch members 33 and 34, may be dispensed with in this case. At the cost of greater overall dimensions, the Geneva wheel mechanism 21 or like device may also be dispensed with, and in this case the transverse movement is continuous instead of intermittent.

Figure 20:
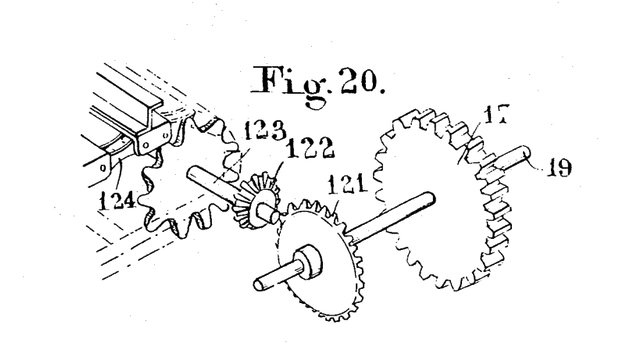
FIG. 20 is a fragmentary perspective view showing a modified form of embodiment of the transmission mechanism in the case of a simplified version of this apparatus.

In this simplified construction the kinematic chain, as shown in FIG. 20, comprises only the toothed wheel 17 meshing with the longitudinal racks 18 of the various trays and a pair of intermediate bevel pinions 121 and 122 for coupling the main driving shaft 19 to the shaft 123 driving a single conveyor belt 124. The transmission ratio of the toothed wheel 17 to the conveyor belt 124 is selected to correspond to the length:width ratio of a movable tray.

Figure 21:
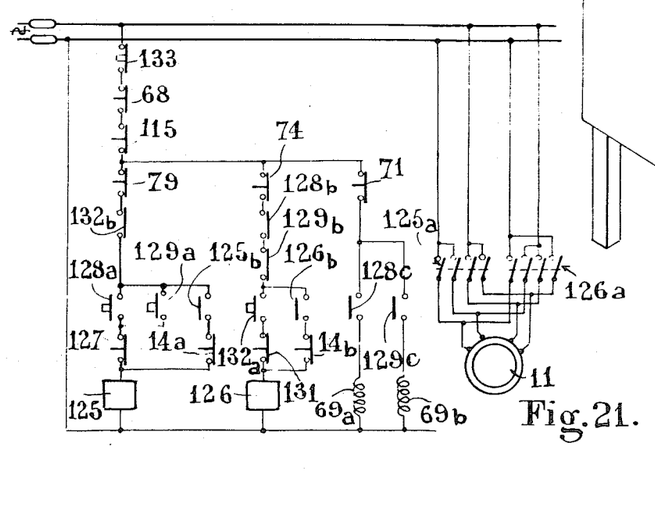
FIG. 21 is a wiring diagram of the control device of the apparatus.

Now reference will be made to FIG. 21 illustrating the wiring diagram of the control system of the apparatus of this invention. The electric motor 11 driving the mechanism is a single-phase motor of the capacitor-starter type adapted to be energized through the contacts 125a and 126a, respectively, of a tray-output relay 125, or of a tray-input relay 126. This motor 11 revolves in one or the other direction according to which relay, 125 or 126, is energized. Relay 125 is connected to the two lines of the AC mains via a pair of parallel circuits, the first circuit comprising a normally closed or back contact 14a responsive to the torque limiter 14 in series with a normally open holding contact 125b of relay 125, the other parallel circuit comprising a normally closed or back contact 127 of a centrifugal coupling device connected in series with a pair of parallel front contacts, namely a contact 128a of a forward drive pushbutton (giving priority to right-hand trays) controlling the starting of the right-hand conveyor belt 4 before the left-hand conveyor belt 3, and a contact 129a of a forward drive pushbutton (giving priority to left-hand trays) controlling on the other hand the starting of the left-hand conveyor belt 3 first, i.e. before the right-hand conveyor belt 4.

The reverse relay 126 controlling the backward movement of the trays into the storage unit 1 is connected in series with a pair of parallel circuits comprising the one a normally closed or back contact 131 of the centrifugal coupling device in series with a normally open contact 132a of a reverse drive pushbutton (controlling the backward movements of the trays into the apparatus) and the other comprises in series a normally open or front holding contact 126b of relay 126 and a normally closed or back contact 14b of torque limiter 14. The energizing circuit of relay 126 further comprises three normally closed or back contacts connected in series, namely contacts 129b of the forward-drive pushbutton (giving priority to left-hand trays), 128b of forward drive pushbutton (giving priority to right-hand trays), and 74 which is the limit switch contact actuated when all the trays have been reintroduced into the storage unit.

Similarly, the energizing circuit of relay 125 comprises a pair of normally closed or back contacts connected in series, namely a contact 132b actuated by the reverse-drive pushbutton controlling the reintroduction of the trays into the apparatus, and the contact 79 actuated at the end of the outward travel of the trays.

The two circuits for energizing the relays 125 and 126 are connected in common to a circuit comprising in series three normally closed or back contacts, namely the safety contact 115 actuated by the gage 109, the safety contact 68 actuated by the pull rod 66 and a contact 133 actuated by the stop pushbutton.

The electric circuit also comprises a pair of electromagnets 69a and 69b each adapted to actuate said pull rod 66 in one direction. These electromagnets are connected in series with normally open or front contacts 128c and 129c, respectively, of the forward drive pushbuttons, these two contacts being connected in turn in common to the limit switch 71 actuated at the end of the reintroduction of the trays into the storage unit, this limit switch 71 being also connected to the three series-connected contacts 115, 68 and 133.

The normally closed or back contacts 127 and 131 are actuated by a centrifugal coupling device which may be associated with the mechanism of the apparatus for giving the certainty that the relay 125 or 126 controlling the opposite movement can be energized after the complex stoppage and the in-insertion of the starter capacitor of the electric motor 11 into the circuit, as required for controlling the direction of rotation of this motor. This safety may also be obtained by means of a timing relay or slow-action pushbuttons.

Figure 22:
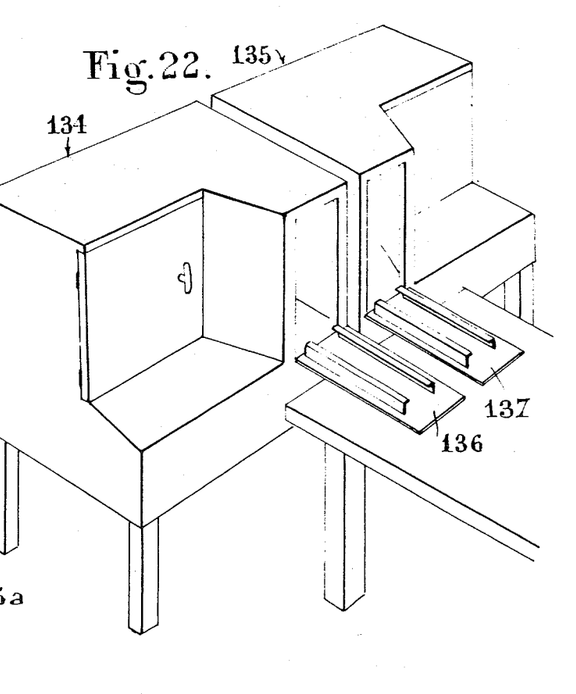
FIG. 22 is a diagrammatic perspective view of a modified form of embodiment of the storage unit of this invention.

FIG. 22 illustrates the simultaneous use of two apparatus 134 and 135 disposed symmetrically in relation to its plane. In this case, their two swinging doors 136 and 137 are disposed side by side and two separate exit axes are provided for the trays. Each apparatus comprises of course only one transverse conveyor belt.

What I claim is:

1. A storage unit for automatically presenting movable trays, which comprises, internally, an electric motor, at least one endless horizontal conveyor driven from said electric motor, a plurality of independent parallel trays carried by the upper reach of said conveyor, said trays being disposed transversely and adapted to carry the objects to be displaced, a plurality of members disposed at spaced intervals on said conveyor and adapted positively to drive said trays in the axial direction of said conveyor while permitting a relative transverse sliding movement of said trays in relation to said conveyor, said trays comprising on their lower face rack means and at their ends coupling members permitting the mutual coupling of said trays to constitute externally of said storage unit a continuous row of trays along an output axis $y-y1$ extending at right angles to the conveyor axis $x-x1$, a toothed driving wheel disposed in front of the end of said conveyor, and at right angles thereto, said wheel being rotatably driven from said electric motor and adapted drivingly to engage said rack means of said successive trays carried by said conveyor, and a transmission mechanism disposed between said electric motor, on the one hand, and said toothed driving wheel and said conveyor, on the other hand, whereby said conveyor can move each tray through a distance corresponding to the width thereof, in the longitudinal direction of said conveyor, while said driving toothed wheel causes the tray having its rack means drivingly engaged with said driving toothed wheel to move forwards by a distance corresponding to the length of said tray, along the tray output axis $y-y1$ disposed at right angles to the conveyor axis $x-x1$.

2. Storage unit as set forth in claim 1, wherein a swinging door disposed in front of said driving toothed wheel is pivoted at its lower portion about a horizontal shaft extending at right angles to the axis $y-y1$ of the outward path of said trays, at least one spring for constantly urging said swinging door to its vertical closed position, rectilinear lateral guide members carried by the inner surface of said swinging door, parallel to the axis $y-y1$ of the outward path of said trays, and, along said conveyor, front and rear lateral guide members disposed parallel to the axis $x-x1$ of said conveyor and formed with curved end portions directed substantially towards said swinging door to facilitate the guiding of said trays during their outward travel.

3. Storage unit as set forth in claim 2, wherein a gage limiting the maximum transverse dimensions of the objects adapted to be moved out and into said storage unit on said trays is provided behind said swinging door, said gage being pivotally mounted about a shaft, retained in its vertical position by at least one spring, and adapted to actuate through a feeler member a normally closed safety switch so as to open said switch and deenergize said electric motor when an object exceeding the permissible transverse dimensions causes said gage to tilt.

4. Storage unit as set forth in claim 3, wherein said pivotal shaft of said gage extends through a pair of cam-forming slots formed in the endmost portions of said rectilinear guide members rigid with said swinging door, the ends of said pivot shaft further engaging apertures formed in the frame structure of the storage unit to permit a relative movement of said gage during the pivotal movements of said swinging door.

5. Storage unit as set forth in claim 1, wherein means are provided for adjusting the outward stroke of said trays, said device comprising a shaft rotatably driven from said electric motor, a worm rigid with said rotary shaft, a nut locked against rotation and engaged by said worm, a sliding shaft parallel to said rotary shaft, a blade pivotally mounted on said sliding shaft, a first normally closed contact inserted into the circuit controlling the energization of said electric motor, said first contact being normally in abutment with said blade, a cam face carried by said blade and adapted to be engaged by said nut at the end of the outward stroke of said trays in order to pivot said blade and open said first contact so as to stop said motor, and a device for manually adjusting the longitudinal position of said sliding shaft and therefore of said blade, for presetting the length of the outward stroke of said trays.

6. Storage unit as set forth in claim 5, wherein a second normally closed contact is inserted into the circuit controlling the energization of said motor, said second contact being responsive to said nut when the latter returns to its inoperative position corresponding to the reintroduction of all the trays into the storage unit, so as to cause the deenergization of said electric motor.

7. Storage unit as set forth in claim 1, wherein each movable tray of rectangular of square configuration comprises at its two longitudinal ends a male coupling member and a female coupling member, respectively, engageable with each other when the various trays are to be coupled to one another in succession, and on its lower face a longitudinal groove engageable by one or a plurality of transverse bars carried by said conveyor.

8. Storage unit as set forth in claim 7, wherein one of said male and female coupling members carries lock bolts engageable into corresponding notches formed in the other coupling member.

9. Storage unit as set forth in claim 7, wherein each tray carries at least one spring-urged pawl having one end adapted to engage a hole formed through the male coupling member of the adjacent tray for interlocking this pair of adjacent trays, fixed cam faces provided for releasing said pawls during the inward movement of said trays, that is, during the reintroduction thereof into said storage unit.

19. Storage unit as set forth in claim 7, wherein said male coupling member is detachably mounted to the tray by means of a sliding spring-loaded bolt engageable into a hole formed in the male coupling member.

11. Storage unit as set forth in claim 1, which comprises two conveyors disposed in coplanar but opposite relationship and symmetrically in relation to the axis of the outward path of said trays, a central leading tray disposed in its stored position between the registering ends of said two conveyors and having its rack in meshing engagement with said driving toothed wheel, and means for causing, after the outward movement of said central tray, the outward movement of the successive trays carried either by one conveyor or by the other conveyor, the various trays supplied by said two conveyors being coupled in succession to the leading tray and with one another, so as to constitute a rectilinear line of trays.

12. Storage unit as set forth in claim 11, which comprises a device for controlling the operation of only one conveyor at a time, said device comprising two driving pinions rotatably driven in opposite directions from said electric motor, a pair of clutch members mounted for free sliding movement on the two shafts of said pinions respectively, toothed wheels for driving said conveyors respectively, said last-named toothed wheels being mounted for free rotation on the shafts of said driving pinions, respectively, and rotatably connected to said clutch members, other members carried by said clutch members and adapted to couple or alternately release said clutch members with respect to said driving pinions, according to the longitudinal position of said clutch members, a control fork fulcrumed about a pivot pin and controlling the sliding movements of said clutch members in opposite directions, a control bar movable in translation, operatively connected to said control fork and provided with a pin slidably engaging cam grooves formed in a drum cam mounted for loose rotation on, but adapted to slide axially in relation to, a shaft, and a train of reduction gears for operatively connecting said drum cam to said electric motor.

13. Storage unit as set forth in claim 12, wherein said drum cam is symmetrical in relation to a transverse median plane and comprises a pair of symmetric cam grooves interconnected centrally of said drum cam by a groove section, said drum cam further comprising, at both ends, transverse retaining grooves engageable, in the two endmost positions of said drum cam, by lockpins carried by the frame structure of the storage unit, the outer faces of said drum cam which define said retaining grooves being provided with notches permitting the passage of holding pins during a sliding axial movement of said drum cam, and a pull rod mounted for axial sliding movement and provided at one end with a pin engaging one of said retaining grooves, said pull rod being adapted to operate a normally closed safety contact inserted into the energizing circuit of said electric motor, said safety contact opening only when said drum cam is in an intermediate position between its endmost positions.

14. Storage unit as set forth in claim 13, wherein a pair of electromagnets operating in opposite directions are adapted to actuate said pull rod for causing the sliding movement thereof in one or other direction.

* * * * *